US010635540B2

(12) United States Patent
Kaufthal et al.

(10) Patent No.: US 10,635,540 B2
(45) Date of Patent: Apr. 28, 2020

(54) MODERN DOCUMENT SAVE AND SYNCHRONIZATION STATUS

(71) Applicant: MICROSOFT TECHNOLOGY LICENSING, LLC, Redmond, WA (US)

(72) Inventors: Jonathan S. Kaufthal, Seattle, WA (US); Matthew S. Feczko, Boston, MA (US); Charles Scott Walker, Sammamish, WA (US); Michael Jeffers, Boston, MA (US); Douglas Lane Milvaney, Cambridge, MA (US); J. David McCall, Cambridge, MA (US); Travis Spomer, Redmond, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 146 days.

(21) Appl. No.: 14/453,481

(22) Filed: Aug. 6, 2014

(65) Prior Publication Data
US 2015/0286533 A1 Oct. 8, 2015

Related U.S. Application Data

(60) Provisional application No. 61/974,385, filed on Apr. 2, 2014.

(51) Int. Cl.
*G06F 11/14* (2006.01)
*G06F 16/27* (2019.01)
(Continued)

(52) U.S. Cl.
CPC ...... *G06F 11/1448* (2013.01); *G06F 3/04817* (2013.01); *G06F 16/178* (2019.01);
(Continued)

(58) Field of Classification Search
CPC .......... G06F 11/1448; G06F 17/30011; G06F 17/30174; G06F 17/30176;
(Continued)

(56) References Cited

U.S. PATENT DOCUMENTS

| 6,476,827 B1 * | 11/2002 | Porter | G06F 17/30011 707/E17.008 |
| 8,237,801 B2 * | 8/2012 | Levien | G06T 1/0007 348/14.02 |

(Continued)

FOREIGN PATENT DOCUMENTS

| CN | 1786942 A | 6/2006 |
| CN | 101458644 A | 6/2009 |

(Continued)

OTHER PUBLICATIONS

"Second Written Opinion Issued in PCT Application No. PCT/US2015/023445", dated Feb. 22, 2016, 8 Pages.
(Continued)

*Primary Examiner* — Tony Mahmoudi
*Assistant Examiner* — Michael Le
(74) *Attorney, Agent, or Firm* — Merchant & Gould P.C.

(57) ABSTRACT

Save and synchronization status information is provided. The save and synchronization status information may be concise yet informative to a user and may provide an indication of the current save state of the document: "saved," "dirty," or "saving." The indication of the current save state may be displayed in a consistent and reliable spot such that the user may reliably know where to look to find the document's save status. Other save states may be included, such as offline or error. The indication may be selectable, such that when selected, the user may see additional save and synchronization status detail, and may be enabled to rename the document.

12 Claims, 13 Drawing Sheets

(51) Int. Cl.
*G06F 16/93* (2019.01)
*G06F 16/178* (2019.01)
*G06F 3/0481* (2013.01)
*G06F 40/197* (2020.01)
*G06F 17/22* (2006.01)

(52) U.S. Cl.
CPC .......... *G06F 16/1787* (2019.01); *G06F 16/27* (2019.01); *G06F 16/93* (2019.01); *G06F 40/197* (2020.01); *G06F 2201/84* (2013.01)

(58) Field of Classification Search
CPC .... G06F 17/30575; G06F 16/27; G06F 16/93; G06F 16/1787; G06F 16/178
USPC .......................................................... 707/639
See application file for complete search history.

(56) References Cited

U.S. PATENT DOCUMENTS

| | | | |
|---|---|---|---|
| 8,385,950 B1 | 2/2013 | Wagner et al. | |
| 8,943,140 B1* | 1/2015 | Kothari | H04L 65/403 709/203 |
| 2002/0147733 A1* | 10/2002 | Gold | G06F 11/1464 |
| 2004/0078754 A1* | 4/2004 | Son | G06F 17/3089 715/202 |
| 2006/0224956 A1 | 10/2006 | Storisteanu et al. | |
| 2007/0030357 A1 | 2/2007 | Levien et al. | |
| 2007/0143324 A1 | 6/2007 | Eichhorst | |
| 2008/0263103 A1* | 10/2008 | McGregor | G06F 21/6218 |
| 2012/0078643 A1* | 3/2012 | Nagpal | G06Q 30/02 705/1.1 |
| 2013/0013875 A1* | 1/2013 | Brown | G06F 17/30115 711/162 |

FOREIGN PATENT DOCUMENTS

| | | |
|---|---|---|
| CN | 101651864 A | 2/2010 |
| CN | 102332035 A | 1/2012 |
| CN | 102681814 A | 9/2012 |
| CN | 102681914 A | 9/2012 |
| EP | 2477123 A2 | 7/2012 |
| WO | 2008019259 A2 | 2/2008 |

OTHER PUBLICATIONS

"Status Bar", Published on: Dec. 9, 2007, Available at: http://www.jarte.com/help_new/status_bar.html.

Patterson, Steve, "Photoshop CS6 New Features—Background Save and Auto Save", Published on: Nov. 1, 2012, Available at: http://www.photoshopessentials.com/basics/background-auto-save-cs6/.

"Dreamweaver Help/Dreamweaver workflow and workspace", Published on: May 14, 2012, Available at: http://helpx.adobe.com/dreamweaver/using/dreamweaver-workflow-workspace.html.

"Auto-save", Retrieved on: Mar. 28, 2014, Available at: http://www.altastar.com/online/help/hs31.htm.

Smith, William, "New Tools for Collaboration: Introducing Microsoft Document Connection", Published on: Jan. 22, 2011, http://www.mactech.com/articles/mactech/Vol.25/25.07/NewToolsforCollaboration-IntroDocumentConnection/index.html.

"Items that appear in the status bar—Background Save and Auto Save", Published on: Jun. 21, 2013, Available at: http://office.microsoft.com/en-in/word-help/items-that-appear-in-the-status-bar-HP005190083.aspx.

"International Search Report and Written Opinion Issued in PCT Patent Application No. PCT/US2015/023445", dated Jul. 30, 2015, 12 Pages.

"ForeverSave version 1.1.3", Published on: Jan. 1, 2009, Available at: http://tool-forcesw.com/docs/ForeverSave_Manual.pdf.

"International Preliminary Report on Patentability Issued in PCT Application No. PCT/US2015/023445", dated Jul. 5, 2016, 9 Pages.

"First Office Action Issued in Chinese Patent Application No. 201580018541.X", dated Dec. 14, 2018, 14 Pages.

"Oral Hearing Issued in European Patent Application No. 15716336.1", dated May 16, 2019, 2 Pages.

"Office Action Issued in Chinese Patent Application No. 201580018541.X", dated May 10, 2019, 13 Pages.

"Oral Hearing Issued in European Patent Application No. 15716336.1", dated Feb. 22, 2019, 9 Pages.

"Fix Time Machine When Stuck on "Preparing Backup" in Mac OS X", Retrieved from: http://osxdaily.com/2014/03/31/time-machine-stuck-preparing-backup-mac-fix/, Mar. 31, 2014, 19 Pages.

"Stop "Excel formula or sheet contains the name" dialog - Super User", Retrieved from: https://superuser.com/questions/377664/stop-excel-formula-or-sheet-contains-the-name-dialog, Jan. 12, 2012, 3 Pages.

"XStandard End-user Guide: Images", Retrieved from: https://web.archive.org/web/20130808074743/http://www.xstandard.com/en/documentation/xstandard-end-user-guide/images/, Aug. 8, 2013, 11 Pages.

"Oral Proceedings Issued in European Patent Application No. 15716336.1", dated Sep. 27, 2019, 16 Pages.

Briones, John-Paul, "Editing a File With Filezilla", Retrieved from: https://web.archive.org/web/20131221074025/https://www.webhostinghub.com/help/learn/website/managing-files/editing-filezilla, Feb. 5, 2013, 3 Pages.

Gabriel, "How to Stop a Stuck Copying Operation?—Apple Community", Retrieved from: https://discussions.apple.com/thread/2117911, Aug. 16, 2009, 4 Pages.

* cited by examiner

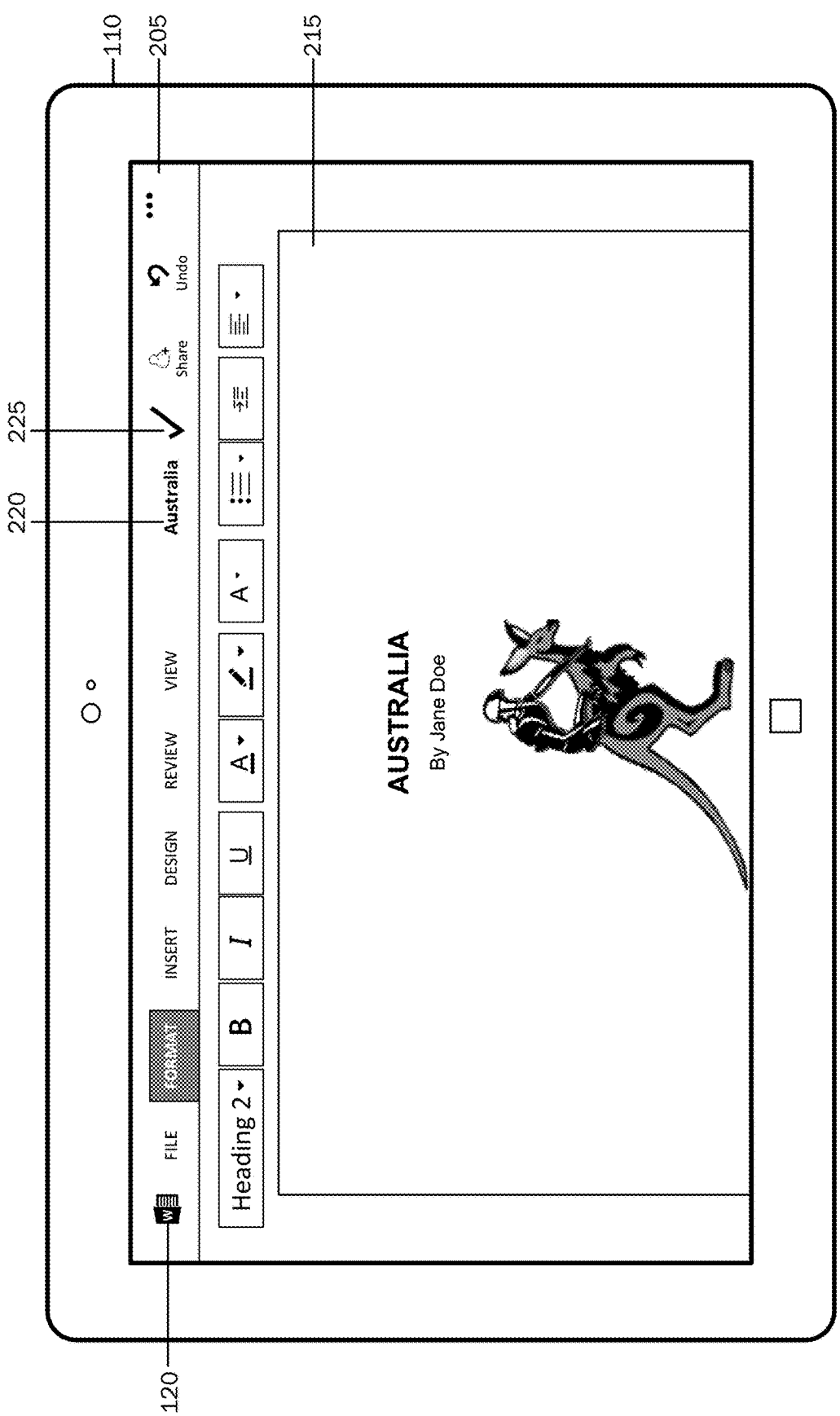

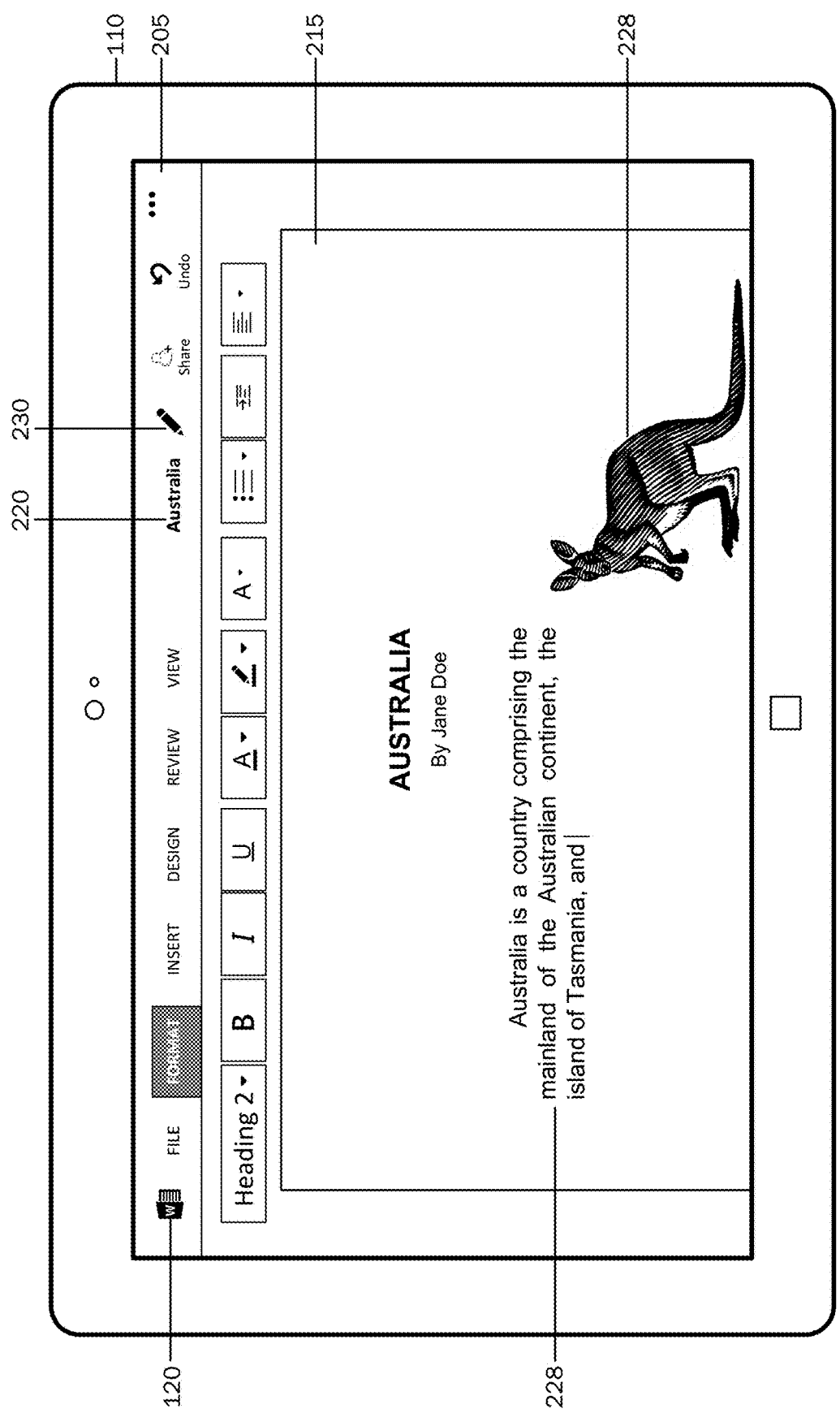

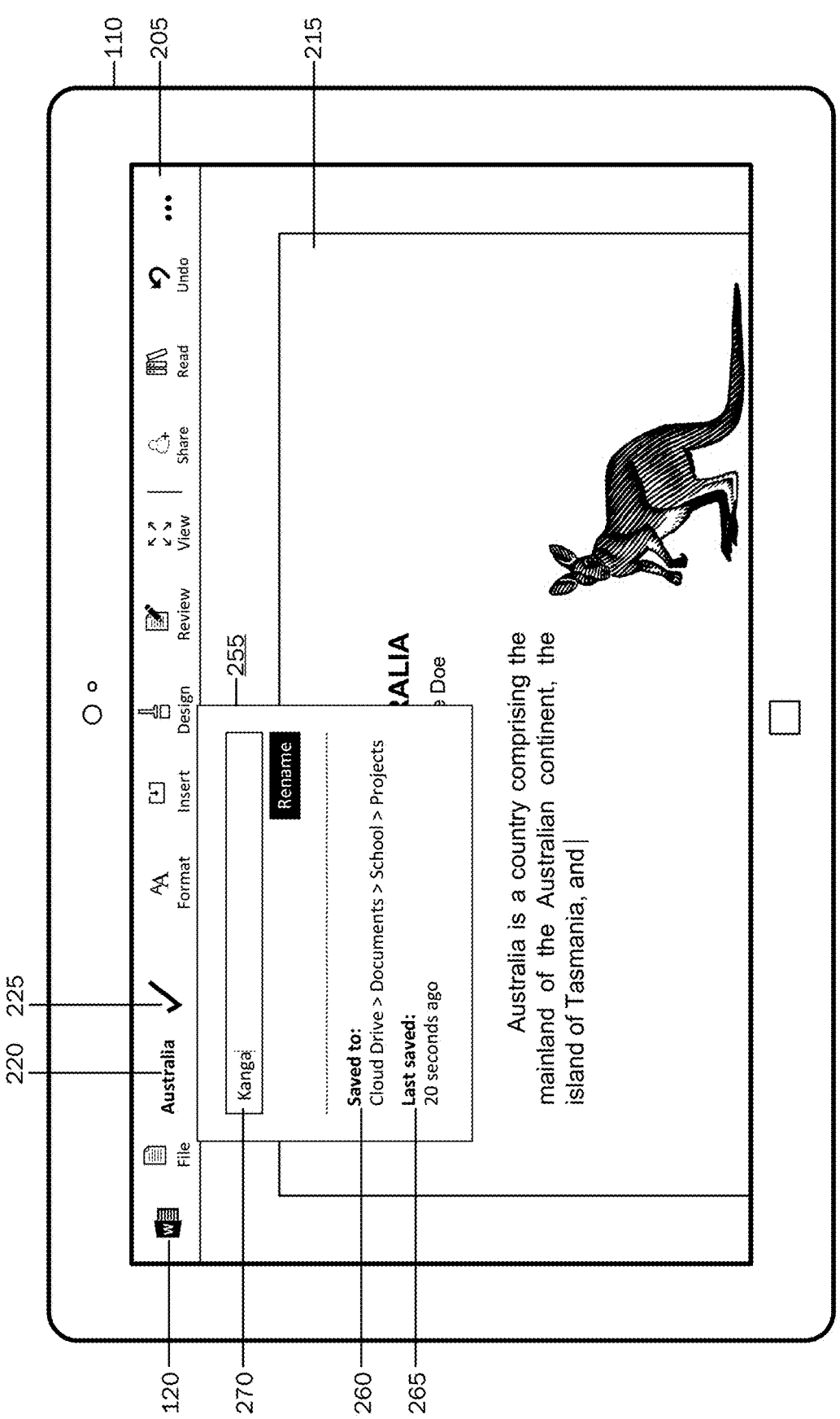

MODERN DOCUMENT SAVE AND SYNCHRONIZATION STATUS

CROSS-REFERENCE TO RELATED APPLICATIONS

The application claims priority to U.S. Provisional Patent Application No. 61/974,385 titled "Modern Document Save and Synchronization Status" filed Apr. 2, 2014, the disclosure of which is hereby incorporated by reference in its entirety.

BACKGROUND

Many applications today are incorporating an automatic save operation (referred to herein as autosave) of documents. Oftentimes, documents may be automatically saved to a cloud storage repository. With autosave, a user may want to know that his/her document is safely saved or if there is a problem with saving his/her document at a glance. At the same time, users are increasingly using smaller form devices, such as tablet computing devices, which have limited screen space. Accordingly, a non-distracting minimal indication of save and synchronization information of a document is needed.

It is with respect to these and other considerations that the present disclosure has been made.

SUMMARY

This summary is provided to introduce a selection of concepts in a simplified form that are further described below in the detailed description. This summary is not intended to identify key features or essential features of the claimed subject matter, nor is it intended as an aid in determining the scope of the claimed subject matter.

Embodiments of the present disclosure solve the above and other problems by providing save and synchronization status information. The save and synchronization status information may be concise yet informative to a user, and may provide an indication of the current save state of the document: "saved," "dirty," or "saving." The indication of the current save state may be displayed in a consistent and reliable spot such that the user may reliably know where to look to find the document's save status. Other save states may be included, such as "offline" or "error." The indication may be selectable, such that when selected, the user may see additional save and synchronization status detail as well as be enabled to rename the document.

The details of one or more embodiments are set forth in the accompanying drawings and description below. Other features and advantages will be apparent from a reading of the following detailed description and a review of the associated drawings. It is to be understood that the following detailed description is explanatory only and is not restrictive of the disclosure as claimed.

BRIEF DESCRIPTION OF THE DRAWINGS

The accompanying drawings, which are incorporated in and constitute a part of this disclosure, illustrate various embodiments of the present disclosure. In the drawings:

FIG. 2A is an illustration of an example user interface displaying save state status information indicating that the document is saved and safe;

FIG. 2B is an illustration of an example user interface displaying save state status information indicating that the document contains changes that have not yet been saved;

FIG. 2G is an illustration of an example user interface displaying save state status information indicating that the document is saved and safe and displaying the user renaming the document;

DETAILED DESCRIPTION

Figure 1:
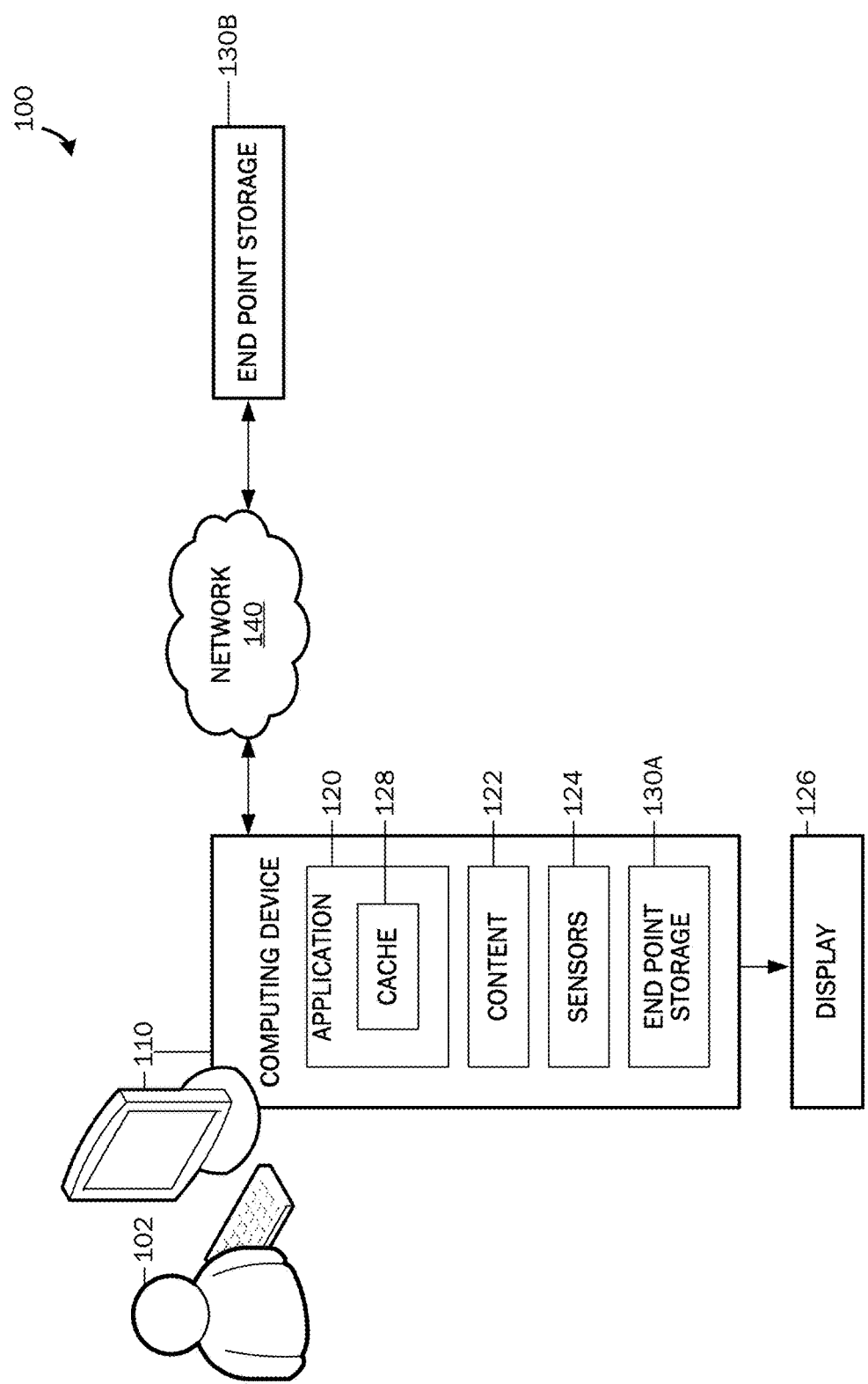
FIG. 1 is a block diagram of one embodiment of a system for providing save and synchronization status information.

The following detailed description refers to the accompanying drawings. Wherever possible, the same reference numbers are used in the drawing and the following description to refer to the same or similar elements. While embodiments of the disclosure may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description does not limit the disclosure, but instead, the proper scope of the disclosure is defined by the appended claims.

As briefly described above, embodiments of the present disclosure are directed to providing save and synchronization status information. The save and synchronization status information may be concise yet informative to a user, and may provide an indication of the current save state of the document: "saved," "dirty," or "saving." The indication of the current save state may be displayed in a consistent and reliable location in the user interface such that the user may reliably know where to look to find the document's save status. Other save states may be included, such as "offline" or "error." The indication may be selectable, such that when selected, the user may see additional save and synchronization status detail and may be enabled to rename the document.

Referring now to the drawings, in which like numerals represent like elements, various embodiments will be described. FIG. 1 is a block diagram illustrating a system architecture 100 for providing save and synchronization status information. The network architecture 100 includes a computing device 110. The computing device 110 may be one of various types of computing devices (e.g., a tablet computing device, a desktop computer, a mobile communication device, a laptop computer, a laptop/tablet hybrid computing device, a large screen multi-touch display, a gaming device, a smart television, or other types of computing devices) for executing applications 120 for performing a variety of tasks.

A user 102 may utilize an application 120 on a computing device 110 for a variety of tasks, which may include, for example, to write, calculate, draw, organize, prepare presentations, send and receive electronic mail, take and organize notes, make music, and the like. Applications 120 may include thick client applications, which may be stored locally on the computing device 110 (as illustrated in FIG. 1), or may include thin client applications (i.e., web applications) that may reside on a remote server and accessible over a network 140, such as the Internet or an intranet. A thin client application may be hosted in a browser-controlled environment or coded in a browser-supported language and reliant on a common web browser to render the application executable on a computing device 110. The computing device 110 may be configured to receive content 122 for presentation on a display 126 (which may comprise a touch screen display). For example, content 122 may include a word processing document 215 (as illustrated in FIGS. 2A-2G) comprising one or more pages.

An application 120 may comprise a document cache 128 where cache representations of files interacted with in the application 120 are saved. The files that are represented in the document cache 128 may map to any number of locations of where the actual storage endpoints are, for example, the files may be server files, may be local files, may be network resource shared files, etc. Files may be saved in the document cache 128 to ensure the data is safe. The document cache 128 may serve as an intermediary between changes that the user 102 makes and a final endpoint storage 130 location of the file. The endpoint storage 130 may be one of various types of document repositories. For example, the endpoint storage 130 may include local computer storage media 130A (e.g., stored on a hard drive, flash drive, etc.) or remote storage 130B (e.g., stored on a server).

An application 120 may be configured to enable a user 102 to use a pointing device (e.g., a mouse, pen/stylus, etc.) and/or to utilize sensors 124 (e.g., touch sensor, accelerometer, hover, facial recognition, voice recognition, light sensor, proximity sensor, gyroscope, tilt sensor, GPS, etc.) on the computing device 110 to interact with content 122 via a number of input modes. To assist users to locate and utilize functionalities of a given application 120, a user interface (UI) 205 containing a plurality of selectable functionality controls may be provided. According to embodiments and as will be described below with reference to FIGS. 2A-2G, save and synchronization status information may also be displayed in the UI 205.

Referring now to FIG. 2A, an example application 120 comprising a user interface 205 is illustrated that may be displayed on any suitable computing device 110 described above. In the illustrated example, the application user interface 205 is shown displayed on a tablet computing device, and comprises a display of a document 215. The document title 220 (in this example, "Australia") is shown displayed in the UI 205.

According to embodiments, the application 120 may be operable to perform an automatic save operation at a predetermined or calculated time interval. To help to provide the user 102 with an understanding that his/her document 215 is saved and safe, an indication of a current save state of the document 215 may be displayed. The indication of the current save state may be a minimal display of information such that the indication may not distract the user 102 nor take up valuable screen space. Additionally, the indication of the current save state may be displayed in a consistent and reliable location such that the user may reliably know where to look to find the document's 215 save status.

As illustrated in FIG. 2A, a "saved" save state indicator 225 is displayed in the UI 205. According to an embodiment, when a document 215 is up to date at its endpoint storage 130, the document is considered to be saved and safe. Accordingly, an indication of the "saved" save state (i.e., "saved" save state indicator 225) may be displayed to indicate to the user 102 that the document 215 is saved and safe. In the example illustrated in FIG. 2A, the "saved" save state indicator 225 is displayed as a check mark. As can be appreciated, the "saved" save state indicator 225 may be represented in a variety of formats which may include various icons, text, animations, etc. According to one embodiment, when the document 215 is saved and safe at the endpoint 130, no visual representation of the save state may be shown.

Referring now to FIG. 2B, an example user interface 205 comprising a display of save state status information indicating that the document 215 contains changes that have not yet been saved (i.e., "dirty" save state indicator 230). As illustrated, the document 215 has been modified (compared with the document 215 as displayed in FIG. 2A). According to embodiments, when an indication of an edit 228 of the document 215 by the user 102 is received, the save state status of the document becomes "dirty," which is a term used herein to describe a save state status of where the document 215 contains changes that are not yet saved. An indication of an edit 228 of the document 215 may include an input made by the user 102 or a tangible change to the document 215 from its previous state.

According to embodiments, when the save state status of the document 215 becomes "dirty," an autosave timer may be started. After a certain time interval, which may be a predetermined time interval or a calculated time interval, an autosave operation may be launched. The autosave timer may be automatically started when an indication of an edit is received, or the autosave timer may be automatically started a certain time interval after the user stops making changes to the document 215. The time interval may be determined by the application 120.

As illustrated in FIG. 2B, a "dirty" save state indicator 230 is displayed in the UI 205. The indication of the "dirty" save state (i.e., "dirty" save state indicator 230) may be displayed to indicate to the user 102 that recent changes to the document 215 have not been saved, but will be saved momentarily. In the example illustrated in FIG. 2B, the "dirty" save state indicator 230 is displayed as a pencil. As can be appreciated, the "dirty" save state indicator 230 may be represented in a variety of formats which may include various icons, text, animations, etc.

Figure 2C:
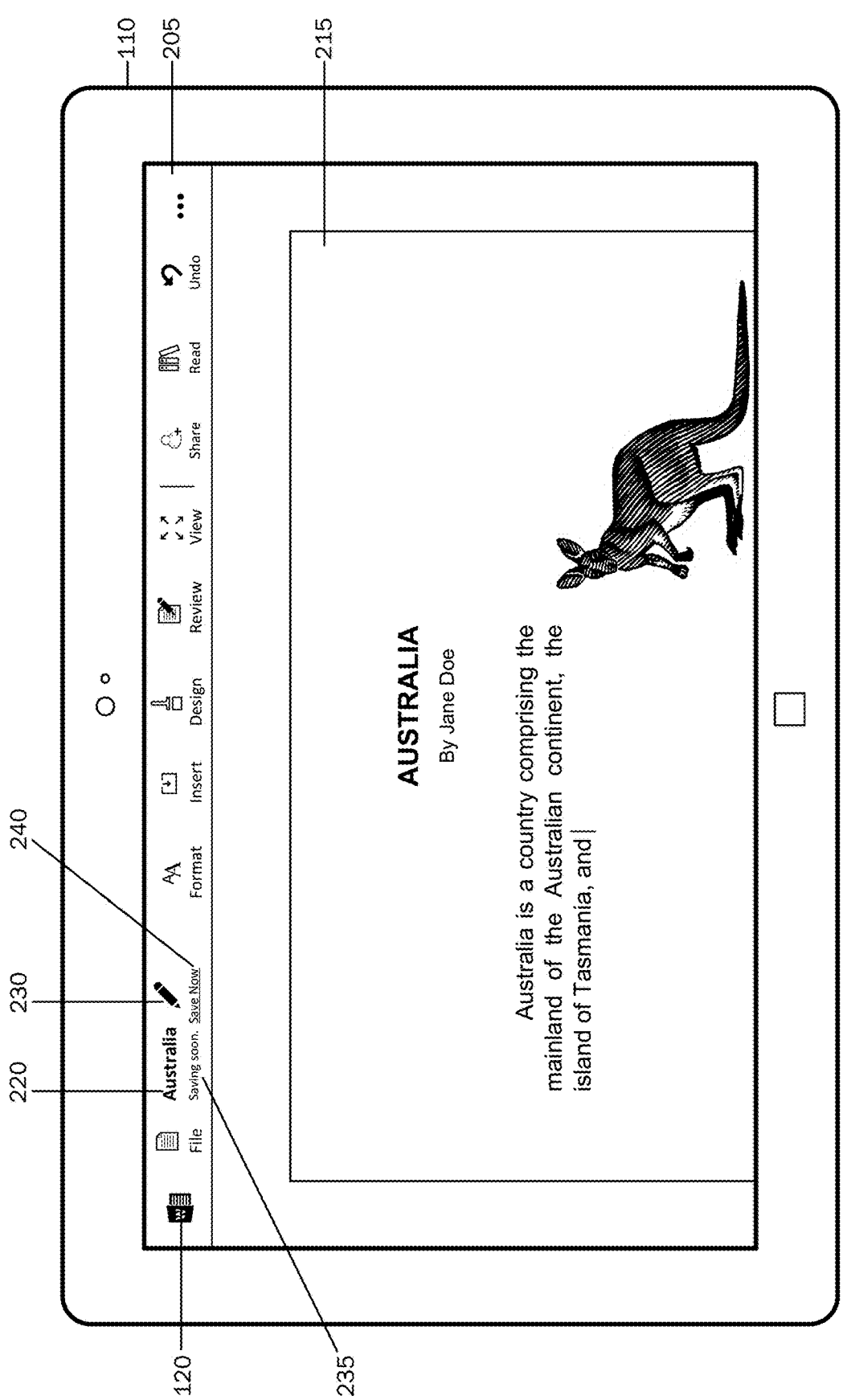
FIG. 2C is an illustration of an example user interface displaying save state status information indicating that the document contains changes that have not yet been saved and a selectable functionality for allowing a user to save now.

As illustrated in FIG. 2C, the document 215 is still in a "dirty" save state. The UI 205 comprises a "dirty" save state indicator 230 to help indicate to the user 102 that the document 215 has been edited (i.e., contains edits 228) since its last save. As mentioned above, the "dirty" save state indicator 230 may be represented in a variety of formats. According to an embodiment and as illustrated in FIG. 2C, status text 235 may be included to help provide save and synchronization status information to the user 102. In the illustrated example, the status text 235 indicates to the user that recent changes will be automatically saved soon. The status text 235 may additionally comprise a selectable save functionality 240, which when selected may initiate a manual save operation.

Figure 2D:
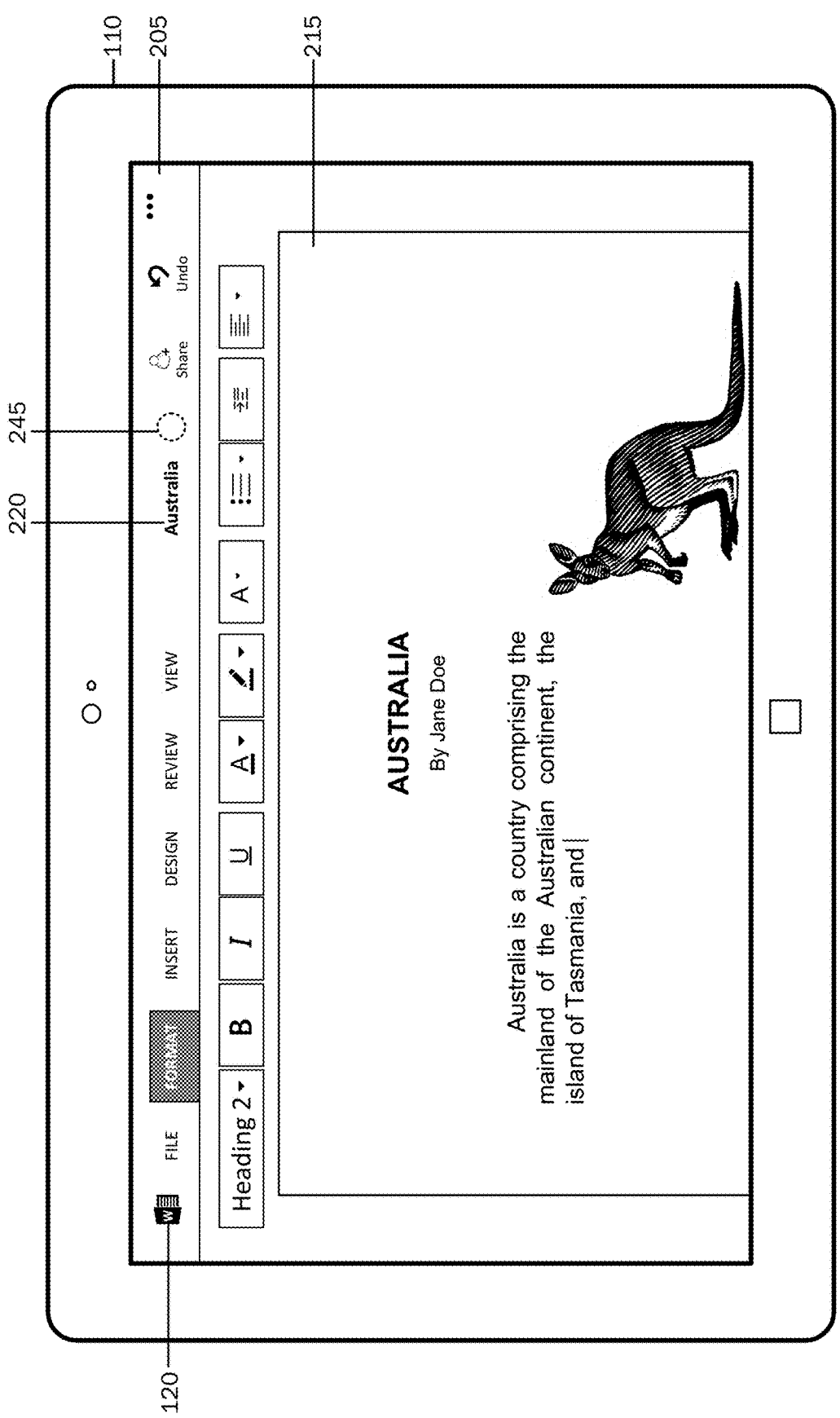
FIG. 2D is an illustration of an example user interface displaying save state status information indicating that the document is being saved.

As described above, a certain time interval after the document 215 enters into a "dirty" save state, a certain time interval after the user 102 stops making changes to the document 215, or upon receiving an indication of a manual user-initiated save operation, a save operation may be launched. Accordingly, an indication of the save operation may be provided in the UI 205. As illustrated in FIG. 2D, a "saving" save state indicator 245 is displayed in the UI 205. The indication of the "saving" save state (i.e., "saving" save state indicator 245) may be displayed to indicate to the user 102 that the document 215 is currently being saved. In the example illustrated in FIG. 2D, the "saving" save state indicator 245 is displayed as a progress ring. As can be appreciated, the "saving" save state indicator 245 may be represented in a variety of formats, which may include various icons, text, animations, etc. According to one embodiment, the "saving" save state indicator 245 may be displayed only when the save operation is going to take more than a predetermined amount of time.

According to embodiments, the save operation may include first saving the content 122 to the document cache 128. When the data is in the document cache 128, the data may be considered safe. As described above, the document cache 128 may serve as an intermediary between changes that the user 102 makes and a final endpoint storage 130 location of the file. The save operation may also include a second step, where the data may be flushed from the document cache 128 to the endpoint storage 130. The endpoint storage 130 may be a local store, cloud storage 250, server store, etc. While the data is being flushed from the document cache 128 to the endpoint storage 130, the "saving" save state indicator 245 may continue to be displayed in the UI 205 as illustrated in FIG. 2D. The "saving" save state indicator 245 may be represented in a variety of formats, which may include various icons, text, animations, etc. For example, if the endpoint storage 130 is a cloud storage server, the "saving" save state indicator 245 may include text indicating that the document 215 is in the process of being saved to the cloud storage server 250 (e.g., "Saving to Cloud Storage Server" 250).

A save operation may be manually cancelled or automatically cancelled. For example, a user 102 may wish to cancel a save operation and select a functionality for aborting the save operation. As another example, a save operation may be automatically cancelled because of restrictions or an error. Accordingly, when an indication of a cancellation of a save operation is received, the save operation may be cancelled, and an indication of the "dirty" save state (i.e., "dirty" save state indicator 230) may be displayed to indicate to the user 102 that recent changes to the document 215 have not been saved. If the cancellation of the save operation is due to an error or restriction, additional information indicating such may be displayed.

Figure 2E:
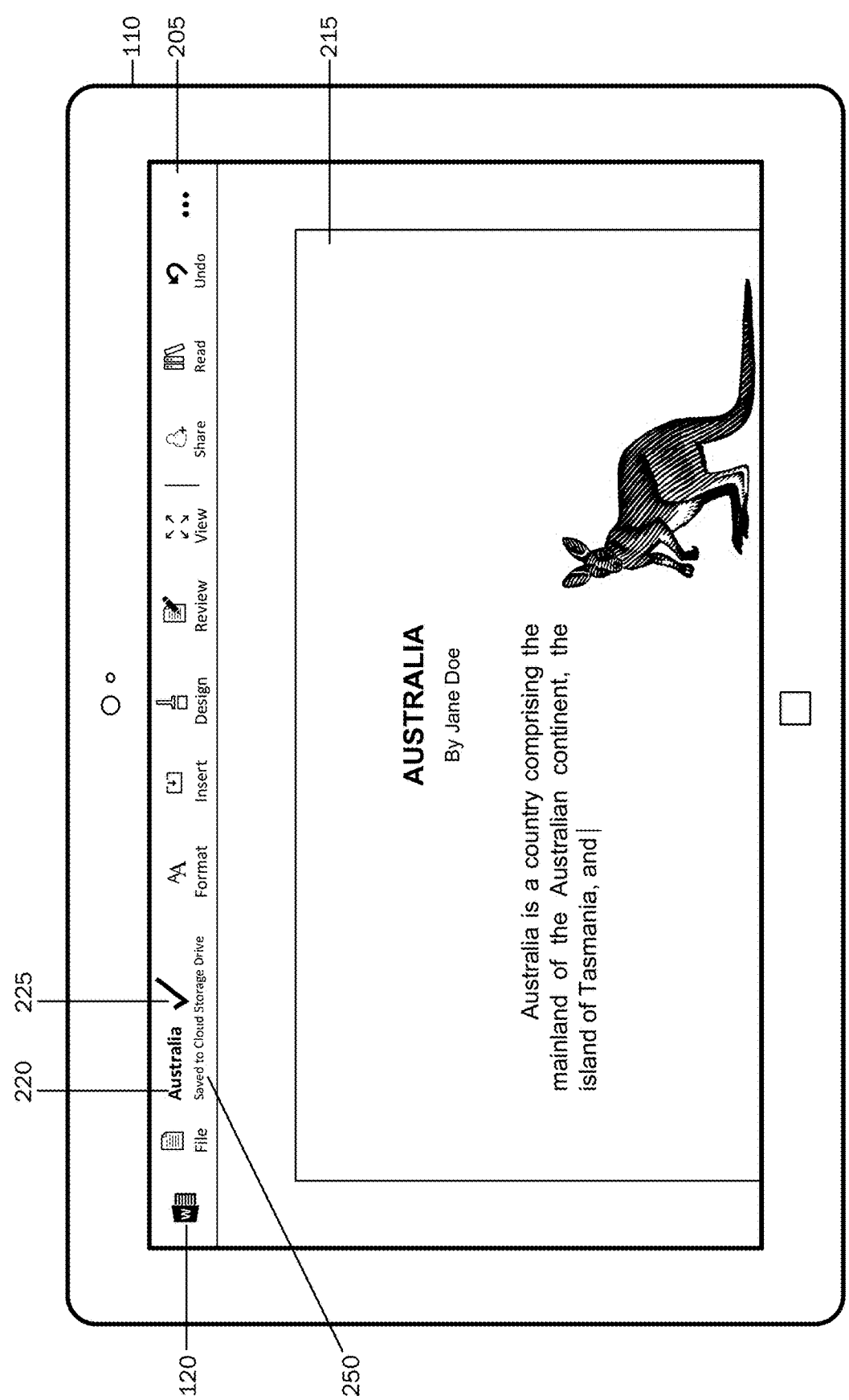
FIG. 2E is an illustration of an example user interface displaying save state status information indicating that the document is saved and safe and an indication of where the document has been saved.

Once the document 215 has been flushed to the endpoint storage 130, the data may be considered saved and safe on the endpoint 130. Accordingly, as illustrated in FIG. 2E, the "saved" save state indicator 225 may again be displayed in the UI 205. The indication of the "saved" save state (i.e., "saved" save state indicator 225) may be displayed to indicate to the user 102 that the document 215 is saved and safe at the endpoint 130. In the example illustrated in FIG. 2E, the "saved" save state indicator 225 is displayed as a check mark. As described above, the "saved" save state indicator 225 may be represented in a variety of formats, which may include various icons, text, animations, etc. For example, if the endpoint storage 130 is a cloud storage server, the "saved" save state indicator 225 may include text indicating that the document 215 is saved to the cloud storage server 250 (e.g., "Saved to Cloud Storage Server"). According to one embodiment, when the document 215 is saved and safe at the endpoint 130, no visual representation of the save state may be shown.

According to embodiments, an indication of other save states may be provided. For example, if the endpoint storage 130 is not local (e.g., on a server), and if a network connection is not detected or if the server cannot be reached, the save state of the document 215 may be an "offline" state where the data is safe in the document cache 128 but may not be flushed to the endpoint storage 130. In such a case, an indication of the "offline" save state may be displayed to indicate to the user 102 that the document 215 is saved and safe on his/her computing device 110, but won't be saved on the server (and thus available to other network-connected devices) until his/her computing device 110 is back online. The "offline" save state indicator may be represented in a variety of formats, which may include various icons, text, animations, etc. For example, the "offline" save state indicator may include an offline icon, a disconnected icon, a warning icon, or may include text such as, "Saved to computer. Upload pending."

Figure 2F:
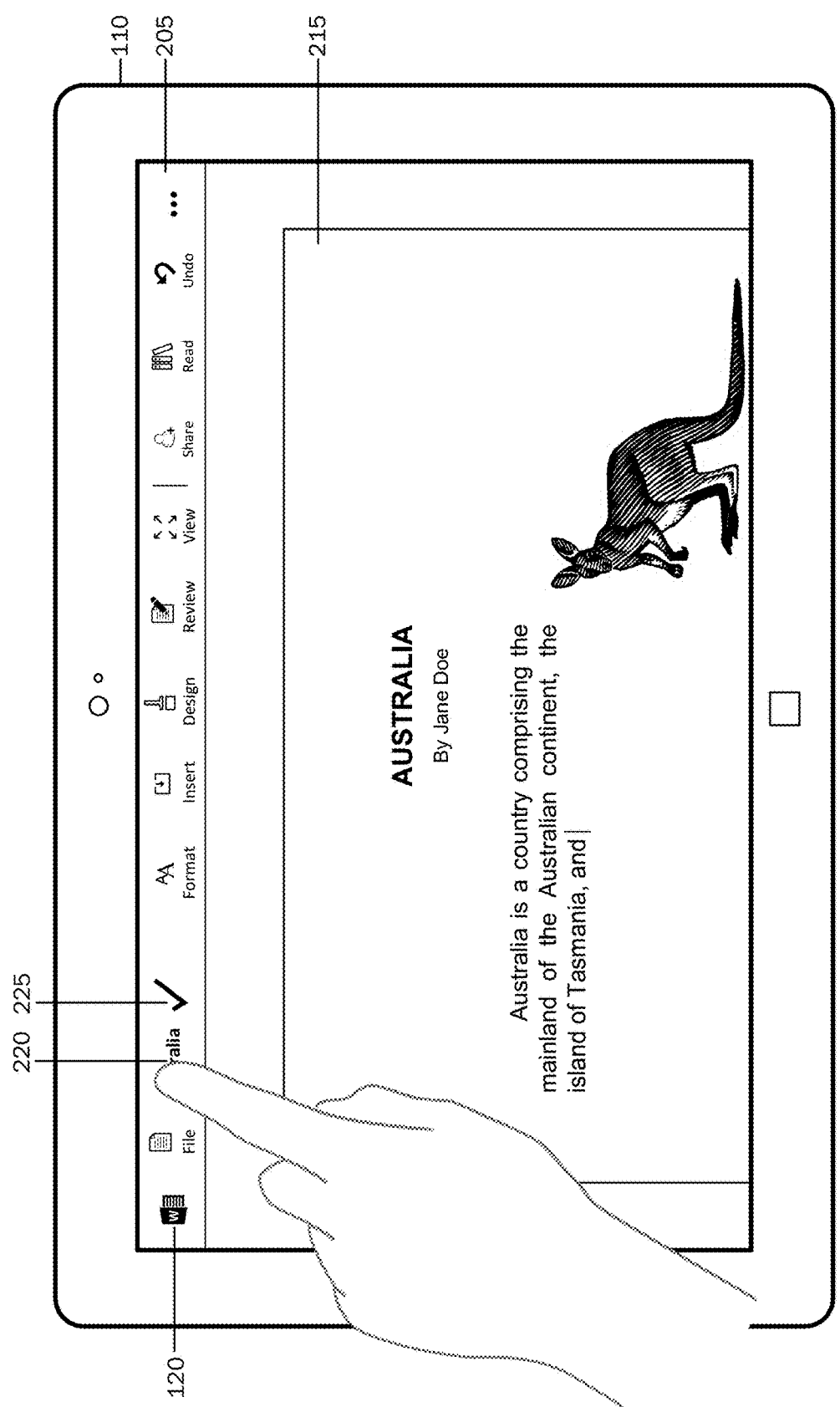
FIG. 2F is an illustration of an example user interface displaying save state status information indicating that the document is saved and safe and displaying a selectable document file name being selected by a user.

According to an embodiment and as illustrated in FIGS. 2F and 2G, the displayed document file name 220 and the save state status indicator 225, 230, 245 may be a single touch selectable target. When selected (FIG. 2F), a UI element 255 may be displayed (FIG. 2G) comprising additional save and synchronization details and endpoint storage 130 location information. For example, the location 260 of the endpoint storage 130, and the time since the last save operation 265 may be displayed. Additionally, a rename field 270 may be provided for enabling the user 102 to rename the document 215.

Figure 3:
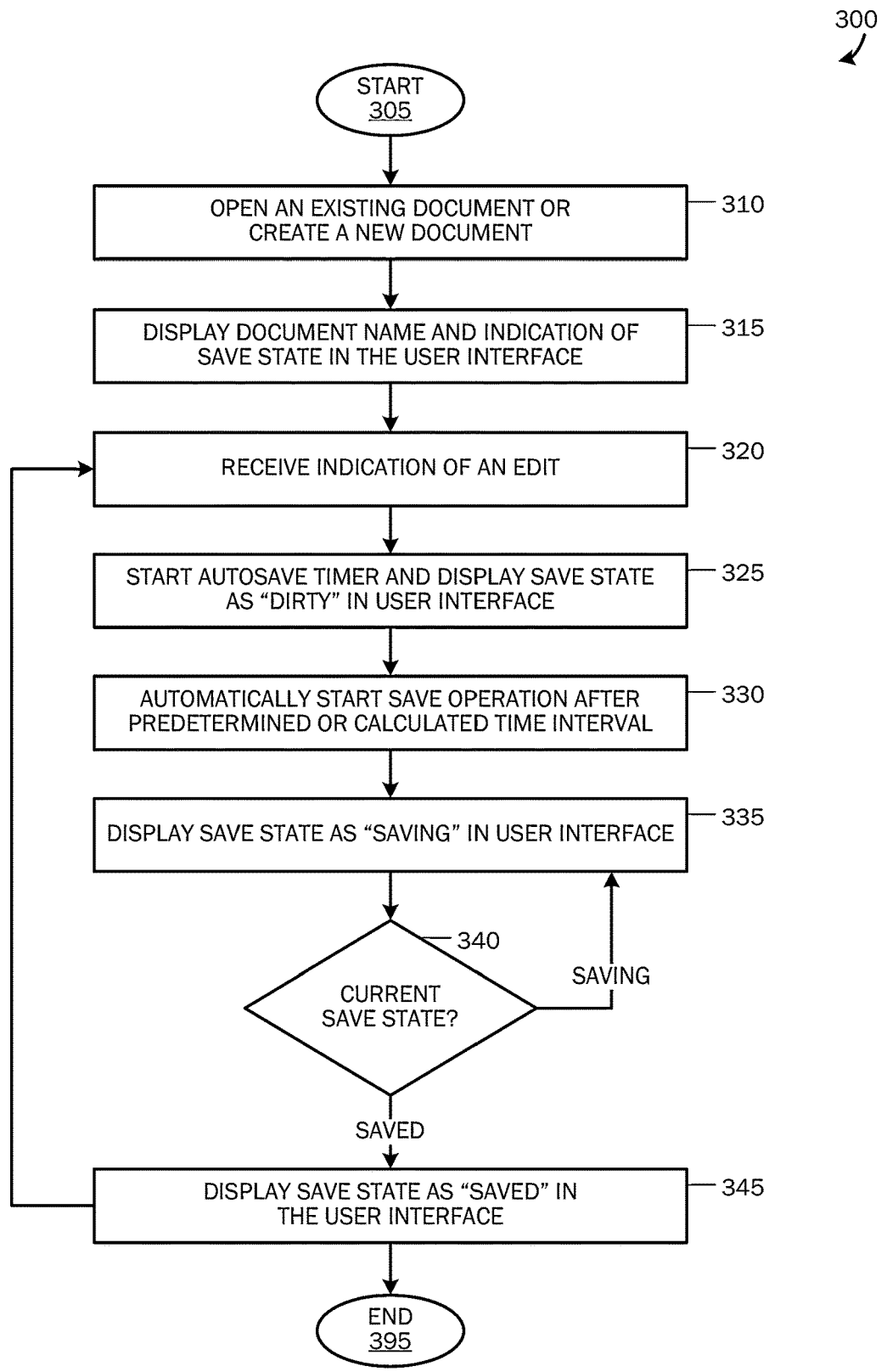
FIG. 3 is a flow chart of a method for providing save and synchronization status information.

FIG. 3 is a flow chart showing one embodiment of a method 300 for providing save and synchronization information. The method 300 starts at OPERATION 305 and proceeds to OPERATION 310, where an existing document 215 may be opened in an application 120 or a new document 215 may be created in the application 120.

The method 300 may proceed to OPERATION 315, where the document name 220 and an indication of the current save state status (i.e., save state indicator 225, 230, 245, 250) may be displayed in the user interface 205. As described above, the save state indicator may include a "saved" save state indicator 225, a "dirty" save state indicator 230, or a "saving" save state indicator 245.

At OPERATION 320, an indication of an edit 228 may be received. An indication of an edit 228 of the document 215 may include an input made by the user 102 or a tangible change to the document 215 from its previous state.

The method 300 may then proceed to OPERATION 325, where the autosave timer may be started, and the indication of the current save state status may be updated to the "dirty" save state indicator 230. As described above, the indication of the "dirty" save state (i.e., "dirty" save state indicator 230) may be displayed to indicate to the user 102 that recent changes to the document 215 have not been saved, but will be saved momentarily.

At OPERATION 330, the save operation may be automatically started after a predetermined or calculated time interval after the start of the autosave timer, which may be a certain time interval after the document 215 enters into a "dirty" save state or a certain time interval after the user 102 stops making changes to the document 215. The save operation may also be started upon receiving an indication of a manual user-initiated save operation. As described above, the save operation may include a first save operation where the document 215 may be saved to the document cache 128 and a subsequent save operation where data may be flushed from the document cache 128 to an endpoint storage 130 location.

When the save operation is started at OPERATION 330, the method 300 may proceed to OPERATION 335, where the current save state status may be updated to the "saving" save state indicator 245. The indication of the "saving" save state may be displayed to indicate to the user 102 that the document 215 is currently being saved.

The method 300 may then proceed to OPERATION 340, where a determination of the current save state is made. If the save operation is in process (i.e., the document 215 is being saved to the document cache 128 or the data in the document cache 128 is being flushed to the endpoint storage 130), the current save state may be determined to be in the "saving" save state. Accordingly, the method 300 may return to OPERATION 335, where the save state indicator may continue to be displayed as the "saving" save state indicator 245.

If the save operation is completed (i.e., the document 215 is saved and safe on the endpoint storage 130), the current save state may be determined to be in the "saved" save state. Accordingly, the method 300 may proceed to OPERATION 345 where the save state indicator may be updated to display the "saved" save state indicator 225.

The method 300 may return to OPERATION 320, where an indication of an edit 228 is received, or may end at OPERATION 395.

While the disclosure has been described in the general context of program modules that execute in conjunction with an application program that runs on an operating system on a computer, those skilled in the art will recognize that the disclosure may also be implemented in combination with other program modules. Generally, program modules include routines, programs, components, data structures, and other types of structures that perform particular tasks or implement particular abstract data types.

The embodiments and functionalities described herein may operate via a multitude of computing systems including, without limitation, desktop computer systems, wired and wireless computing systems, mobile computing systems (e.g., mobile telephones, netbooks, tablet or slate type computers, notebook computers, and laptop computers), hand-held devices, multiprocessor systems, microprocessor-based or programmable consumer electronics, minicomputers, and mainframe computers.

In addition, the embodiments and functionalities described herein may operate over distributed systems (e.g., cloud-based computing systems), where application functionality, memory, data storage and retrieval and various processing functions may be operated remotely from each other over a distributed computing network, such as the Internet or an intranet. User interfaces and information of various types may be displayed via on-board computing device displays or via remote display units associated with one or more computing devices. For example user interfaces and information of various types may be displayed and interacted with on a wall surface onto which user interfaces and information of various types are projected. Interaction with the multitude of computing systems with which embodiments of the disclosure may be practiced include, keystroke entry, touch screen entry, voice or other audio entry, gesture entry where an associated computing device is equipped with detection (e.g., camera) functionality for capturing and interpreting user gestures for controlling the functionality of the computing device, and the like.

Figure 4:
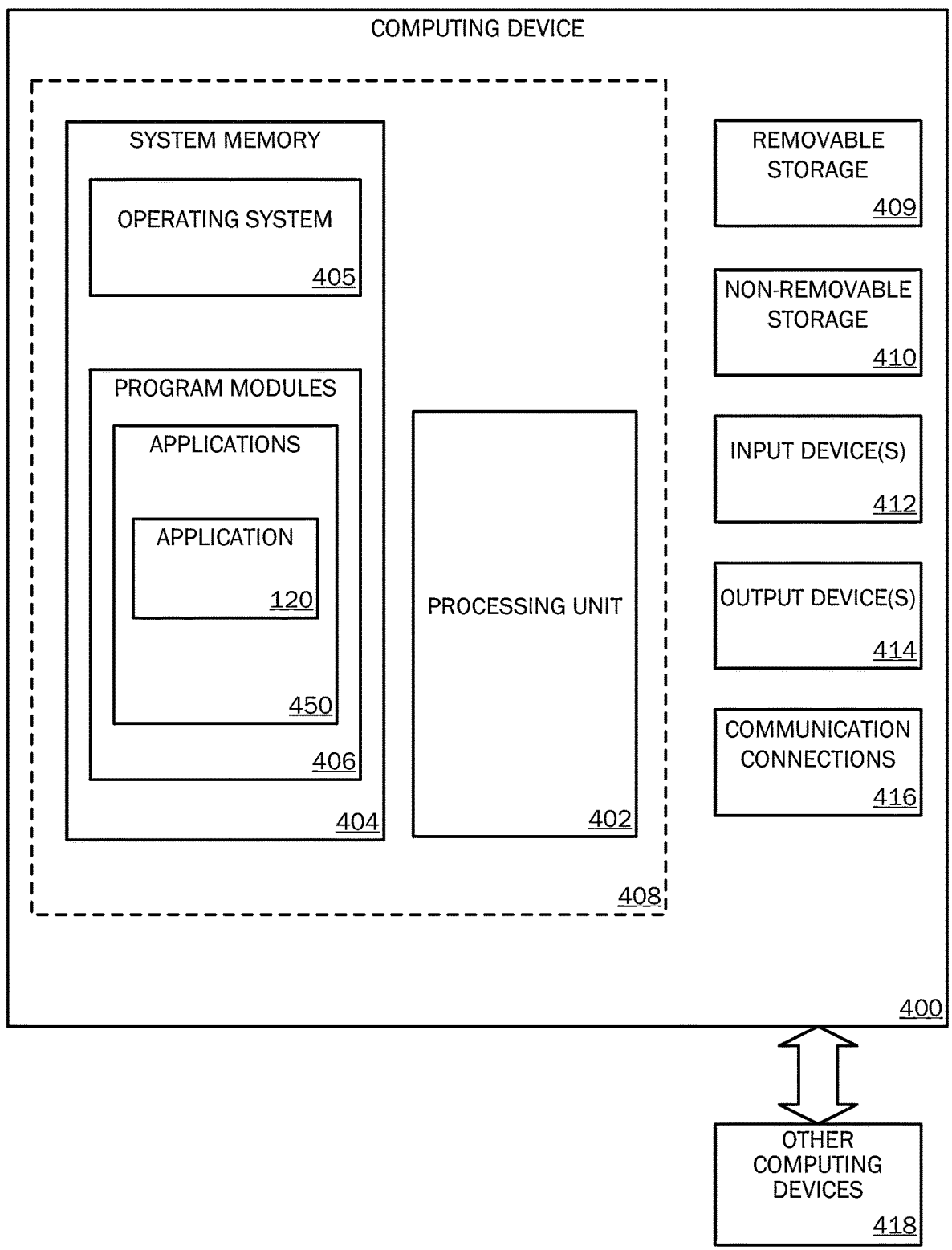
FIG. 4 is a block diagram illustrating example physical components of a computing device with which embodiments of the present disclosure may be practiced.
Figure 5A:
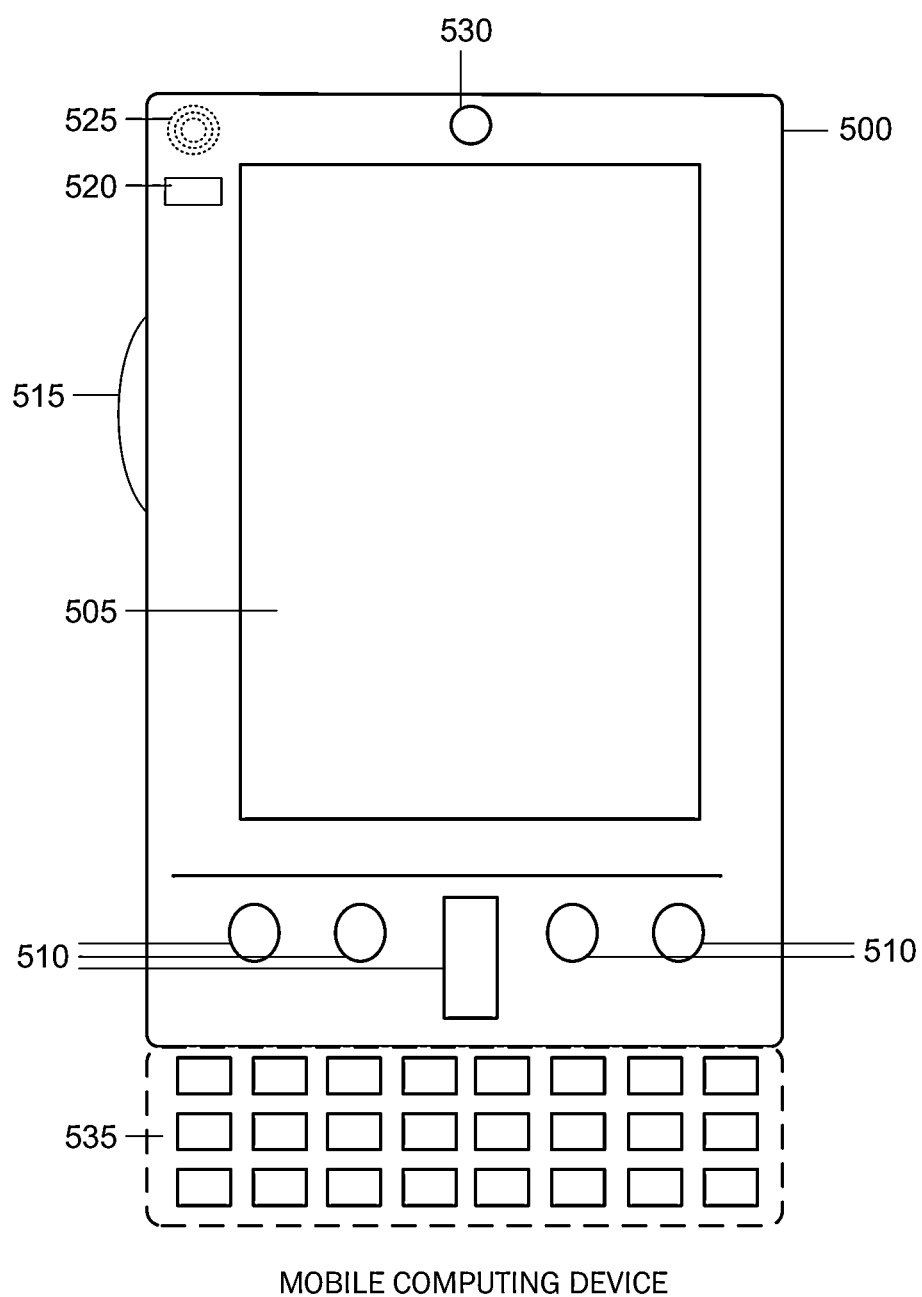
FIGS. 5A and 5B are simplified block diagrams of a mobile computing device with which embodiments of the present disclosure may be practiced.
Figure 5B:
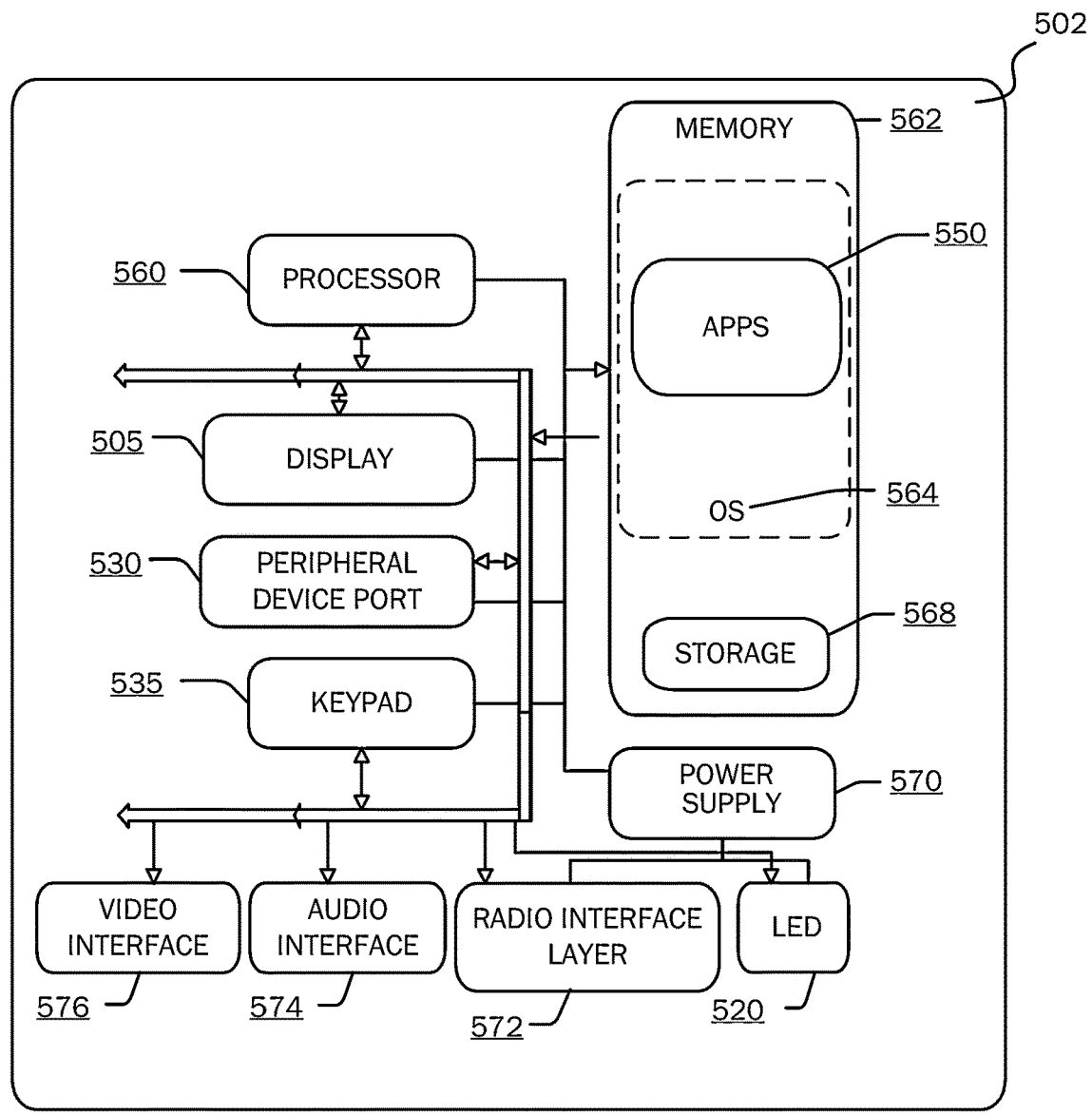
Figure 6:
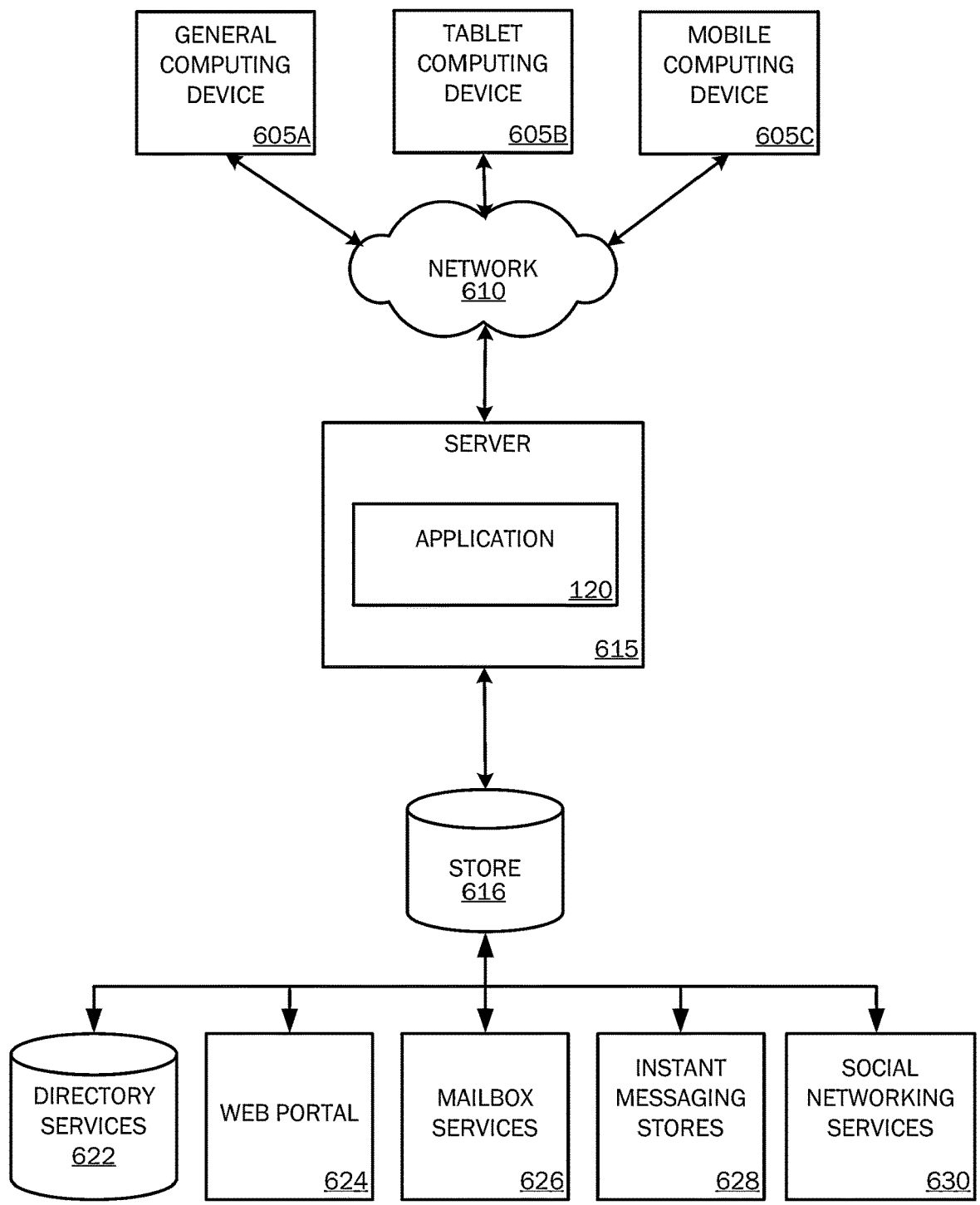
FIG. 6 is a simplified block diagram of a distributed computing system in which embodiments of the present disclosure may be practiced.

FIGS. 4-6 and the associated descriptions provide a discussion of a variety of operating environments in which embodiments of the disclosure may be practiced. However, the devices and systems illustrated and discussed with respect to FIGS. 4-6 are for purposes of example and illustration and are not limiting of a vast number of computing device configurations that may be utilized for practicing embodiments of the disclosure, described herein.

FIG. 4 is a block diagram illustrating physical components (i.e., hardware) of a computing device 400 with which embodiments of the disclosure may be practiced. The computing device components described below may be suitable for the computing device 110 described above. In a basic configuration, the computing device 400 may include at least one processing unit 402 and a system memory 404. Depending on the configuration and type of computing device, the system memory 404 may comprise, but is not limited to, volatile storage (e.g., random access memory), non-volatile storage (e.g., read-only memory), flash memory, or any combination of such memories. The system memory 404 may include an operating system 405 and one or more program modules 406 suitable for running software applications 450 such as client application 120. The operating system 405, for example, may be suitable for controlling the operation of the computing device 400. Furthermore, embodiments of the disclosure may be practiced in conjunction with a graphics library, other operating systems, or any other application program and is not limited to any particular application or system. This basic configuration is illustrated in FIG. 4 by those components within a dashed line 408. The computing device 400 may have additional features or functionality. For example, the computing device 400 may also include additional data storage devices (removable and/or non-removable) such as, for example, magnetic disks, optical disks, or tape. Such additional storage is illustrated in FIG. 4 by a removable storage device 409 and a non-removable storage device 410.

As stated above, a number of program modules and data files may be stored in the system memory 404. While executing on the processing unit 402, the program modules 406 may perform processes including, but not limited to, one or more of the stages of the method 300 illustrated in FIG. 3. Other program modules that may be used in accordance with embodiments of the present disclosure and may include applications such as electronic mail and contacts applications, word processing applications, spreadsheet applications, database applications, slide presentation applications, drawing or computer-aided application programs, etc.

Furthermore, embodiments of the disclosure may be practiced in an electrical circuit comprising discrete electronic elements, packaged or integrated electronic chips containing logic gates, a circuit utilizing a microprocessor, or on a single chip containing electronic elements or microprocessors. For example, embodiments of the disclosure may be practiced via a system-on-a-chip (SOC) where each or many of the components illustrated in FIG. 4 may be integrated onto a single integrated circuit. Such an SOC device may include one or more processing units, graphics units, communications units, system virtualization units and various application functionality all of which are integrated (or "burned") onto the chip substrate as a single integrated circuit. When operating via an SOC, the functionality, described herein, with respect to providing save and synchronization status information may be operated via application-specific logic integrated with other components of the computing device 400 on the single integrated circuit (chip). Embodiments of the disclosure may also be practiced using other technologies capable of performing logical operations such as, for example, AND, OR, and NOT, including but not limited to mechanical, optical, fluidic, and quantum technologies. In addition, embodiments of the disclosure may be practiced within a general purpose computer or in any other circuits or systems.

The computing device 400 may also have one or more input device(s) 412 such as a keyboard, a mouse, a pen, a sound input device, a touch input device, etc. The output device(s) 414 such as a display, speakers, a printer, etc. may also be included. The aforementioned devices are examples and others may be used. The computing device 400 may include one or more communication connections 416 allowing communications with other computing devices 418. Examples of suitable communication connections 416 include, but are not limited to, RF transmitter, receiver, and/or transceiver circuitry; universal serial bus (USB), parallel, and/or serial ports.

The term computer readable media as used herein may include computer storage media. Computer storage media may include volatile and nonvolatile, removable and non-removable media implemented in any method or technology for storage of information, such as computer readable instructions, data structures, or program modules. The system memory 404, the removable storage device 409, and the non-removable storage device 410 are all computer storage media examples (i.e., memory storage.) Computer storage media may include RAM, ROM, electrically erasable programmable read-only memory (EEPROM), flash memory or other memory technology, CD-ROM, digital versatile disks (DVD) or other optical storage, magnetic cassettes, magnetic tape, magnetic disk storage or other magnetic storage devices, or any other article of manufacture which can be used to store information and which can be accessed by the computing device 400. Any such computer storage media may be part of the computing device 400. Computer storage media does not include a carrier wave or other propagated data signal.

Communication media may be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media.

FIGS. 5A and 5B illustrate a mobile computing device 500, for example, a mobile telephone, a smart phone, a tablet personal computer, a laptop computer, and the like, with which embodiments of the disclosure may be practiced. With reference to FIG. 5A, one embodiment of a mobile computing device 500 for implementing the embodiments is illustrated. In a basic configuration, the mobile computing device 500 is a handheld computer having both input elements and output elements. The mobile computing device 500 typically includes a display 505 and one or more input buttons 510 that allow the user to enter information into the mobile computing device 500. The display 505 of the mobile computing device 500 may also function as an input device (e.g., a touch screen display). If included, an optional side input element 515 allows further user input. The side input element 515 may be a rotary switch, a button, or any other type of manual input element. In alternative embodiments, mobile computing device 500 may incorporate more or less input elements. For example, the display 505 may not be a touch screen in some embodiments. In yet another alternative embodiment, the mobile computing device 500 is a portable phone system, such as a cellular phone. The mobile computing device 500 may also include an optional keypad 535. Optional keypad 535 may be a physical keypad or a "soft" keypad generated on the touch screen display. In various embodiments, the output elements include the display 505 for showing a graphical user interface (GUI), a visual indicator 520 (e.g., a light emitting diode), and/or an audio transducer 525 (e.g., a speaker). In some embodiments, the mobile computing device 500 incorporates a vibration transducer for providing the user with tactile feedback. In yet another embodiment, the mobile computing device 500 incorporates input and/or output ports, such as an audio input (e.g., a microphone jack), an audio output (e.g., a headphone jack), and a video output (e.g., a HDMI port) for sending signals to or receiving signals from an external device.

FIG. 5B is a block diagram illustrating the architecture of one embodiment of a mobile computing device. That is, the mobile computing device 500 can incorporate a system (i.e., an architecture) 502 to implement some embodiments. In one embodiment, the system 502 is implemented as a "smart phone" capable of running one or more applications (e.g., browser, e-mail, calendaring, contact managers, messaging clients, games, and media clients/players). In some embodiments, the system 502 is integrated as a computing device, such as an integrated personal digital assistant (PDA) and wireless phone.

One or more application programs 550 may be loaded into the memory 562 and run on or in association with the operating system 564. Examples of the application programs include phone dialer programs, e-mail programs, personal information management (PIM) programs, word processing programs, spreadsheet programs, Internet browser programs, messaging programs, and so forth. The system 502 also includes a non-volatile storage area 568 within the memory 562. The non-volatile storage area 568 may be used to store persistent information that should not be lost if the system 502 is powered down. The application programs 550 may use and store information in the non-volatile storage area 568, such as e-mail or other messages used by an e-mail application, and the like. A synchronization application (not shown) also resides on the system 502 and is programmed to interact with a corresponding synchronization application resident on a host computer to keep the information stored in the non-volatile storage area 568 synchronized with corresponding information stored at the host computer. As should be appreciated, other applications may be loaded into the memory 562 and run on the mobile computing device 500.

The system 502 has a power supply 570, which may be implemented as one or more batteries. The power supply 570 might further include an external power source, such as an AC adapter or a powered docking cradle that supplements or recharges the batteries.

The system 502 may also include a radio 572 that performs the function of transmitting and receiving radio frequency communications. The radio 572 facilitates wireless connectivity between the system 502 and the "outside world," via a communications carrier or service provider. Transmissions to and from the radio 572 are conducted under control of the operating system 564. In other words, communications received by the radio 572 may be disseminated to the application programs 550 via the operating system 564, and vice versa.

The visual indicator 520 may be used to provide visual notifications and/or an audio interface 574 may be used for producing audible notifications via the audio transducer 525. In the illustrated embodiment, the visual indicator 520 is a light emitting diode (LED) and the audio transducer 525 is a speaker. These devices may be directly coupled to the power supply 570 so that when activated, they remain on for a duration dictated by the notification mechanism even though the processor 560 and other components might shut down for conserving battery power. The LED may be programmed to remain on indefinitely until the user takes action to indicate the powered-on status of the device. The audio interface 574 is used to provide audible signals to and receive audible signals from the user. For example, in addition to being coupled to the audio transducer 525, the audio interface 574 may also be coupled to a microphone to receive audible input, such as to facilitate a telephone conversation. In accordance with embodiments of the present disclosure, the microphone may also serve as an audio sensor to facilitate control of notifications, as will be described below. The system 502 may further include a video interface 576 that enables an operation of an on-board camera 530 to record still images, video stream, and the like.

A mobile computing device 500 implementing the system 502 may have additional features or functionality. For example, the mobile computing device 500 may also include additional data storage devices (removable and/or non-removable) such as, magnetic disks, optical disks, or tape. Such additional storage is illustrated in FIG. 5B by the non-volatile storage area 568.

Data/information generated or captured by the mobile computing device 500 and stored via the system 502 may be stored locally on the mobile computing device 500, as described above, or the data may be stored on any number of storage media that may be accessed by the device via the radio 572 or via a wired connection between the mobile computing device 500 and a separate computing device associated with the mobile computing device 500, for example, a server computer in a distributed computing network, such as the Internet. As should be appreciated such data/information may be accessed via the mobile computing device 500 via the radio 572 or via a distributed computing network. Similarly, such data/information may be readily transferred between computing devices for storage and use according to well-known data/information transfer and storage means, including electronic mail and collaborative data/information sharing systems.

FIG. 6 illustrates one embodiment of the architecture of a system for providing save and synchronization status information, as described above. Content developed, interacted with, or edited in association with the application 120 may be stored in different communication channels or other storage types. For example, various documents may be stored using a directory service 622, a web portal 624, a mailbox service 626, an instant messaging store 628, or a social networking site 630. The application 120 may use any of these types of systems or the like for save and synchronization status information, as described herein. A server 615 may provide the application 120 to clients. As one example, the server 615 may be a web server providing the application 120 over the web. The server 615 may provide the application 120 over the web to clients through a network 610. By way of example, the client computing device 110 may be implemented and embodied in a personal computer 605A, a tablet computing device 605B and/or a mobile computing device 605C (e.g., a smart phone), or other computing device. Any of these embodiments of the client computing device may obtain content from the store 616.

Embodiments of the present disclosure, for example, are described above with reference to block diagrams and/or operational illustrations of methods, systems, and computer program products according to embodiments of the disclosure. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

The description and illustration of one or more embodiments provided in this application are not intended to limit or restrict the scope of the disclosure as claimed in any way. The embodiments, examples, and details provided in this application are considered sufficient to convey possession and enable others to make and use the best mode of claimed disclosure. The claimed disclosure should not be construed as being limited to any embodiment, example, or detail provided in this application. Regardless of whether shown and described in combination or separately, the various features (both structural and methodological) are intended to be selectively included or omitted to produce an embodiment with a particular set of features. Having been provided with the description and illustration of the present application, one skilled in the art may envision variations, modifications, and alternate embodiments falling within the spirit of the broader aspects of the general inventive concept embodied in this application that do not depart from the broader scope of the claimed disclosure.

We claim:

1. A computer-implemented method of indicating a save status of an electronic document, the method comprising:

causing display of an electronic document within a user interface of an application running on a computing device;

causing display of an indicator, in the forms of both an icon and text, of a current save status of the electronic document in the user interface, the text including a selectable text portion to initiate a manual save of the electronic document;

causing display of a title of the electronic document proximate the current save status, wherein the title and the current save status together comprise a single touch selectable target; and receiving a selection of the single touch selectable target and, in response to the selection, causing concurrent display of a user interface element with the single touch selectable target, wherein the user interface element includes an identification of a location where the electronic document is saved, an indication of an amount of time elapsed since a last save of the electronic document and a rename field that accepts a new name for the electronic document.

2. The method of claim 1, wherein the save status is changeable between a save state, a dirty save state and a saving state, wherein the save state indicates the electronic document is up-to-date at an endpoint storage, the dirty save state indicates the electronic document contains changes that have not yet been saved, and the saving state indicates the electronic document is currently being saved.

3. The method of claim 2, wherein the save status is additionally changeable to an offline state, wherein the offline state indicates the electronic document is stored in a document cache but not at the endpoint storage.

4. The method of claim 1, wherein the text includes an indication of the time until a next autosave of the electronic document.

5. A system to indicate a save status of an electronic document, the system comprising:
   one or more processors; and
   a memory storing executable instructions coupled to the one or more processors, wherein the one or more processors executing the instructions are caused to:
      cause display of an electronic document within a user interface;
      cause display of an indicator, in the forms of both an icon and text, of a current save status of the electronic document in the user interface, the text including a selectable text portion to initiate a manual save of the electronic document;
      cause display of a title of the electronic document proximate the current save status, wherein the title and the current save status together comprises a single touch selectable target; and
      receive a selection of the single touch selectable target and, in response to the selection, cause concurrent display of a user interface element with the single touch selectable target, wherein the user interface element includes an identification of a location where the electronic document is saved, an indication of an amount of time elapsed since a last save of the electronic document and a rename field that accepts a new name for the electronic document.

6. The system of claim 5, wherein the save status is changeable between a save state, a dirty save state and a saving state, wherein the save state indicates the electronic document is up-to-date at an endpoint storage, the dirty save state indicates the electronic document contains changes that have not yet been saved, and the saving state indicates the electronic document is currently being saved.

7. The system of claim 6, wherein the save status is additionally changeable to an offline state, wherein the offline state indicates the electronic document is stored in a document cache but not at the endpoint storage.

8. The system of claim 5, wherein the text includes an indication of the time until a next autosave of the electronic document.

9. A computer readable storage device containing computer executable instructions which when executed by a computer perform a method to indicate a save status for an electronic document, the method comprising:
   causing display of an electronic document within a user interface;
   causing display of an indicator, in the forms of both an icon and text, of a current save status of the electronic document in the user interface, the text including a selectable text portion to initiate a manual save of the electronic document;
   causing display of a title of the electronic document proximate the current save status, wherein the title and the current save status together comprise a single touch selectable target; and
   receiving a selection of the single touch selectable target and, in response to the selection, causing concurrent display of a user interface element with the single touch selectable target, wherein the user interface element includes an identification of a location where the electronic document is saved, an indication of an amount of time elapsed since a last save of the electronic document and a rename field that accepts a new name for the electronic document.

10. The computer readable storage device of claim 9, wherein the save status is changeable between a save state, a dirty save state and a saving state, wherein the save state indicates the electronic document is up-to-date at an endpoint storage, the dirty save state indicates the electronic document contains changes that have not yet been saved, and the saving state indicates the electronic document is currently being saved.

11. The computer readable storage device of claim 10, wherein the save status is additionally changeable to an offline state, wherein the offline state indicates the electronic document is stored in a document cache but not at the endpoint storage.

12. The computer readable storage device of claim 9, wherein the text includes an indication of the time until a next autosave of the electronic document.

* * * * *